United States Patent
Boodaei et al.

(10) Patent No.: US 11,546,390 B1
(45) Date of Patent: Jan. 3, 2023

(54) PEER-SUPERVISED VIDEO CONFERENCE BASED ACCOUNT RECOVERY

(71) Applicant: Transmit Security Ltd., Tel-Aviv (IL)

(72) Inventors: Michael Boodaei, Givatayim (IL); Eldan Ben-Haim, Kiryat Ono (IL)

(73) Assignee: Transmit Security Ltd., Tel-Aviv (IL)

(*) Notice: Subject to any disclaimer, the term of this patent is extended or adjusted under 35 U.S.C. 154(b) by 0 days.

(21) Appl. No.: 17/460,493

(22) Filed: Aug. 30, 2021

(51) Int. Cl.
| | | |
|---|---|---|
| *H04L 29/06* | (2006.01) |
| *H04L 65/1076* | (2022.01) |
| *H04L 12/18* | (2006.01) |
| *H04N 7/15* | (2006.01) |
| *H04L 9/40* | (2022.01) |
| *H04L 67/02* | (2022.01) |
| *G06V 40/20* | (2022.01) |
| *G06V 40/40* | (2022.01) |

(52) U.S. Cl.
CPC .......... *H04L 65/1076* (2013.01); *G06V 40/20* (2022.01); *G06V 40/45* (2022.01); *H04L 12/1822* (2013.01); *H04L 63/0861* (2013.01); *H04L 67/02* (2013.01); *H04N 7/15* (2013.01)

(58) Field of Classification Search
CPC . H04L 12/1822; H04L 63/0861; H04L 67/02; H04N 7/15; G06V 40/20; G06V 40/45
See application file for complete search history.

(56) References Cited

U.S. PATENT DOCUMENTS

| | | | | |
|---|---|---|---|---|
| 10,110,583 | B1 * | 10/2018 | Krstic | ................... H04L 63/105 |
| 11,290,465 | B1 * | 3/2022 | Lyons | ................... H04L 9/3247 |
| 2010/0293600 | A1 * | 11/2010 | Schechter | ............... G06F 21/31 |
| | | | | 726/4 |
| 2012/0166553 | A1 | 6/2012 | Rubinstein et al. | |
| 2014/0150072 | A1 * | 5/2014 | Castro | ..................... G06F 21/40 |
| | | | | 726/5 |
| 2018/0068334 | A1 * | 3/2018 | Alomar | .............. G06Q 30/0209 |
| 2020/0242232 | A1 * | 7/2020 | Machani | ............. H04L 63/0884 |
| 2020/0301646 | A1 * | 9/2020 | Aoki | ...................... G06F 3/0481 |
| 2021/0192039 | A1 * | 6/2021 | Pihur | ........................ H04L 9/14 |

* cited by examiner

*Primary Examiner* — Chirag R Patel

(57) ABSTRACT

Disclosed herein are systems and methods for recovering online services user accounts of users based on verification of the users in video conferences, comprising receiving a request for recovering an account of a user of an online service, establishing one or more video conference sessions between a client device used by the user, client devices used by one or more trustees associated with the user and a bot agent initiated for the video conference session(s), operating the bot agent during the one or more video conference sessions to guide the one or more trustees to verify an identity of the user, and initiating an account recovery process for the account of the user in response to receiving a positive verification verdict from the one or more trustees.

17 Claims, 4 Drawing Sheets

PEER-SUPERVISED VIDEO CONFERENCE BASED ACCOUNT RECOVERY

FIELD AND BACKGROUND OF THE INVENTION

The present invention, in some embodiments thereof, relates to recovering an online service account of a user, and, more specifically, but not exclusively, to recovering an online service account of a user after verifying the user's identity by one or more trustees associated with the user during video conference session.

Access to online services in general and to secure online resources in particular, is typically subject to user authentication to verify the identity of the user before granted access to online service.

However, in some scenarios under some circumstances and/or due to some deficiencies users may often be unable to provide at least some of their appropriate access information or credentials, for example, an access code, a password, a biometric signature and/or the like and may be therefore unable to access the online service.

SUMMARY OF THE INVENTION

According to a first aspect of the present invention there is provided a computer implemented method of recovering account of a user based on verification of the user in a video conference, comprising:
  Receiving a request for recovering an account of a user of an online service.
  Establishing one or more video conference sessions between a client device used by the user, another client device used by one or more trustees and a bot agent initiated for the one or more video conference sessions, the one or more trustees associated with the user has an account in the online service.
  Operating the bot agent during the one or more video conference sessions to guide the one or more trustees to verify an identity of the user.
  Initiating an account recovery process for the account of the user in response to receiving a positive verification verdict from the one or more trustees.

According to a second aspect of the present invention there is provided a system for recovering account of a user based on verification of the user in a video conference, comprising one or more processor configured to execute a code. The code comprising:
  Code instructions to receive a request for recovering an account of a user of an online service.
  code instructions to establish one or more video conference sessions between a client device used by the user, another client device used by one or more trustees and a bot agent initiated for the one or more video conference sessions, the one or more trustees associated with the user has an account in the online service.
  Code instructions to operate the bot agent during the one or more video conference sessions to guide the one or more trustees to verify an identity of the user.
  Code instructions to initiate an account recovery process for the account of the user in response to receiving a positive verification verdict from the one or more trustees.

According to a third aspect of the present invention there is provided a computer program product for recovering account of a user based on verification of the user in a video conference, comprising a non-transitory medium storing thereon computer program instructions which, when executed by one or more hardware processors, cause the one or more hardware processors to:
  Receive a request for recovering an account of a user of an online service.
  Establish one or more video conference sessions between a client device used by the user, another client device used by one or more trustees and a bot agent initiated for the one or more video conference sessions, the one or more trustees associated with the user has an account in the online service.
  Operate the bot agent during the one or more video conference sessions to guide the one or more trustees to verify an identity of the user.
  Initiate an account recovery process for the account of the user in response to receiving a positive verification verdict from the one or more trustees.

In an optional implementation form of the first and second aspects, the identity of the user is verified by a plurality of trustees associated with the user by:
  Establishing one or more other video conference sessions between the client device used by the user, one or more other client devices used by one or more other trustees associated with the user and another bot agent.
  Operating the another bot agent during the one or more other video conference sessions to guide the one or more other trustees to verify the identity of the user.
  Initiating the account recovery process in response to receiving a positive verification verdict from the one or more trustees and from the one or more other trustees.

In a further implementation form of the first and second aspects, the one or more trustees associated with the user are acquainted with the user.

In a further implementation form of the first and second aspects, the user and his associated one or more trustees are members of a common organization.

In a further implementation form of the first and second aspects, the one or more trustees are invited to the one or more video conference sessions by transmitting one or more messages to the one or more trustees via one or more contact channels predefined for the one or more trustees.

In a further implementation form of the first and second aspects, the one or more trustees are admitted into the one or more video conferences sessions after successfully authenticated.

In a further implementation form of the first and second aspects, the guidance provided by the bot agent comprises presenting the claimed identity of the user to the one or more trustees.

In a further implementation form of the first and second aspects, the guidance provided by the bot agent comprises instructing the one or more trustees to verify the identity of the user based on visual appearance of the user.

In an optional implementation form of the first and second aspects, one or more liveness verification algorithms are applied to determine the user is genuine.

In an optional implementation form of the first and second aspects, the bot agent is operated to instruct the user to perform one or more gestures visually analyzed to verify liveness of the user.

In an optional implementation form of the first and second aspects, the bot agent is operated to instruct the user to pronounce one or more syllables analyzed to verify liveness of the user.

In a further implementation form of the first and second aspects, the guidance provided by the bot agent further comprising instructing the one or more trustees to request the user to provide one or more real-world information items relating to the user that is used by the one or more trustees to verify the identity of the user.

In an optional implementation form of the first and second aspects, in addition to the verification verdict of the one or more trustees, the identity of the user is further verified based on one or more biometric patterns of the user captured during the one or more video conference sessions compared to respective biometric signatures recorded in the account of the user. The one or more biometric patterns are a member of a group consisting of: a face pattern, an iris pattern, a voice pattern, and a fingerprint pattern.

In a further implementation form of the first and second aspects, the account recovery process is initiated by transmitting to the client device used by the user a one-time use link to a recovery site.

In an optional implementation form of the first and second aspects, a unique secret assigned to the account recovery process is transmitted to the client device used by the user. The unique secret is provided via the client device when accessing the recovery site.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
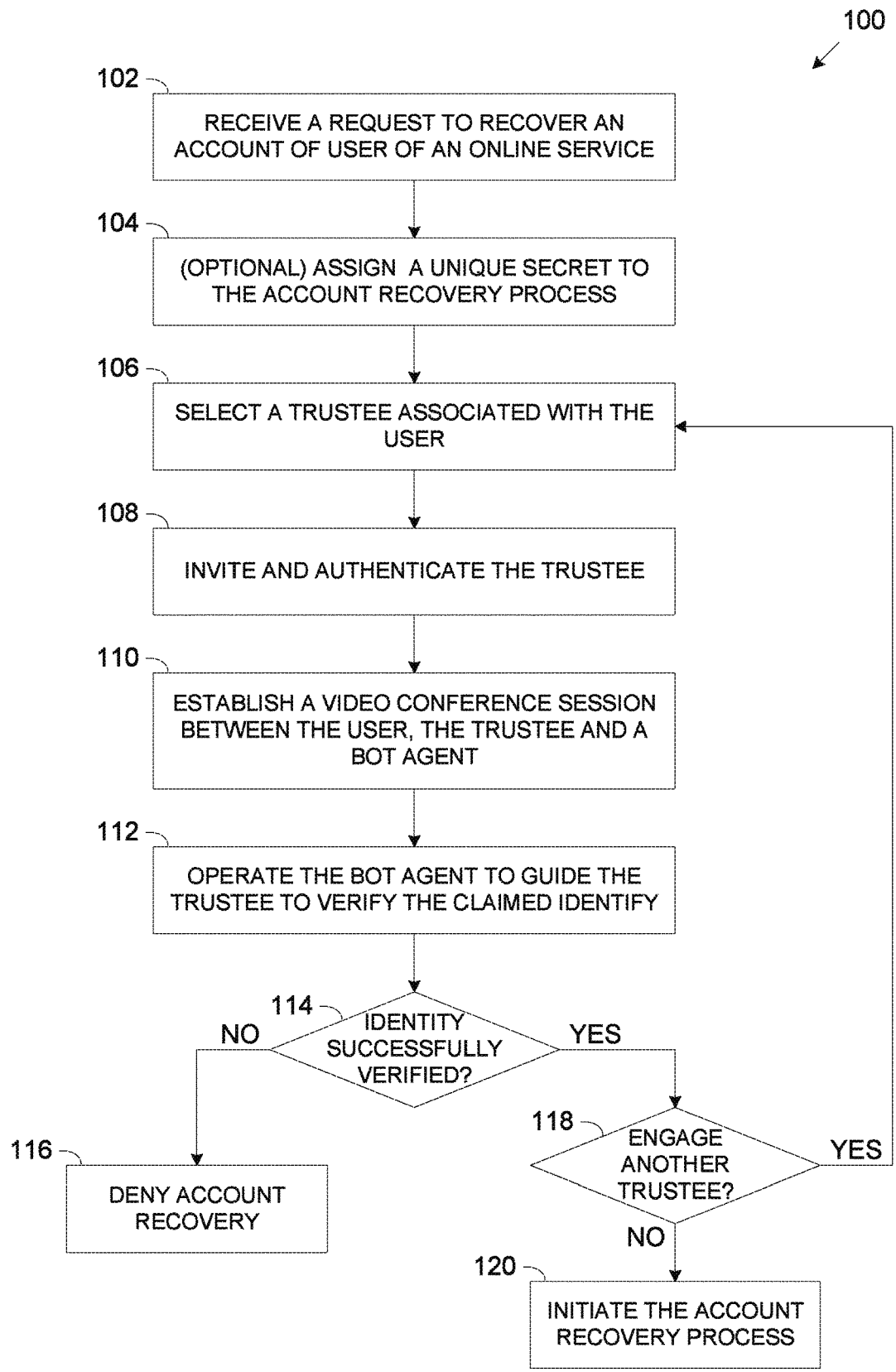
FIG. 1 is a flowchart of an exemplary process of recovering an online service account of a user based on verification of the user's identity by one or more trustees during a video conference session, according to some embodiments of the present invention.

The present invention, in some embodiments thereof, relates to recovering an online service account of a user, and, more specifically, but not exclusively, to recovering an online service account of a user after verifying the user's identity by one or more trustees associated with the user during video conference session.

According to some embodiments of the present invention, there are provided methods, systems, devices and computer software programs for initiating account recovery for one or more users of an online service who are unable to provide at least some of their access information and/or credentials, for example, a password, a code, a secret data item, a biometric signature and/or the like and thus unable to access their accounts in an online service (locked-out).

Specifically, the account recovery may be initiated for a (locked-out) user after the user is successfully authenticated, i.e., the identity of the user is verified by one or more trustees associated with the user which are in some sort of relation with the user and are therefore acquainted with the user in the real world, for example, a family member, a work colleague, an instructor, a teacher and/or the like.

The account recovery process may be executed by one or more systems, services and/or applications, for example, an Identity Provider (IDP) deployed to serve one or more of the online services to prove users' identity and authorize authenticated users to access the online service(s). Optionally, the account recovery process may be executed may be executed by one or more of the online services themselves independent of a separate IDP.

In order to increase integrity, security of the account recovery process and/or its immunity to malicious exploitation, each trustee must be first authenticated by verifying his identify to ensure he is indeed the person he claims to be, each trustee may be also a registered user of the online service and/or registered at the IDP. Each trustee may be thus authenticated accordingly by logging into his account in the online service and/or according to his registration data, for example, credentials at the IDP.

One or more trustees may be selected to verify the identity of the user and may be first authenticated, for example, according to their account in the online service and/or according to their registration data at the IDP. A video conference session may be established between the user and each selected trustee.

Moreover, a bot (software robot) agent may be initiated to participate and control the video conference session, in particular, to guide the trustee through the verification process to ensure that the trustee properly, reliably, accurately and/or decisively identifies the user and verifies or disapproves his identity accordingly.

The bot agent may be operated to instruct the trustee to visually verify the user based on his visual appearance during the video conference session. However, the bot agent may be further operated to instruct the trustee to interrogate the user and request the user to provide information which may be used by the trustee to verify that the user is indeed who he claims to be. In particular, the bot may instruct the trustee to request the user to provide private information that may be known only to user and to the trustee or to a limited number of people at worst.

The verification process may be repeated with one or more additional trustees of the user in respective one or more video conference sessions.

The identity of the user may be then verified or disapproved based on the verification verdict received from the trustee(s) who participated in the verification process.

Optionally, one or more liveness verification algorithms may be applied to verify liveness of the user participating in the video conference session in order to estimate and determine accordingly whether the user is a real live person or a potential impersonator, whether human, artificial, a previous recording of the user and/or synthetically fabricated (deep fake). Moreover, the bot agent may be operated to instruct the user to perform one or more gestures and/or pronounce one or more syllables during the video conference session in order to improve the liveness verification.

Optionally, in addition to the verification verdict of the trustee(s), the identity of the user may be further verified based on verifying one or more biometric patterns of the user captured during the video conference session(s), for example, a face pattern, an iris pattern, a voice pattern a fingerprint pattern and/or the like compared to respective recorded biometric signatures of the user.

In case the user is successfully authenticated, i.e., the identity of the user is positively verified by the trustee(s), an account recovery process may be initiated for the user to enable the user regain access to his account in the online service.

Optionally, the verification process in which the identity of the user is verified by his associated trustees is assigned a unique secret which may be used by the user during the account recovery process to correlate between the specific verification process conducted for the user and the specific account recovery process initiated for the user.

One or more account recovery sessions, specifically the video conference sessions during which the trustees verified the identity of one or more users may be recorded and stored. The recorded video conference sessions may be analyzed, specifically in case of suspected fraudulent access or attempted access to further investigate whether the accessing user(s) is genuine as well as explore potential deficiencies in the conduct of the trustees and/or in the operation of the bot agent.

Conducting account recovery for users locked out of their accounts in the online service based on verification of the users' identity by their associated trustees having real-world acquaintance with the users may present major advantages and benefits compared to existing account recovery methods and systems.

First, the existing account recovery methods may typically be highly complicated entailing massive friction with the users requesting to recover their accounts due to various security measures applied to ensure that each user is indeed the person he claims to be, for example, conducting phone calls with the users, physically meeting the users, requesting official identification documents and/or the like. Such security measures may naturally involve prolonged and exhausting interaction with the user which may significantly degrade the user experience. Conducting the video conference session with one or more trustees, on the other hand, may be significantly simpler and shorter requiring only little attention, time and/or effort by the user which may in turn significantly improve the user experience.

Moreover, the security measure employed by the existing account recovery methods may inflict significant costs as they may require significantly increased resources, either human resources and/or computing resources to accommodate the interaction (e.g. phone, meeting) with the users. In contrast to that, the video conference sessions established to verify the identity of the users by the trustee(s) may be done automatically typically using existing resources and/or services which may significantly reduce the costs and resources involved in the account recovery process.

Furthermore, the security measures employed by the existing account recovery methods may be limited in their security due to lack of personal acquaintance with the users. For example, a person may impersonate as another person (the user) during a phone call or a meeting conducted to verify the user as part of the recovery process. In another example, identification documents may be forged and/or fabricated by malicious parties impersonating as legitimate users to attest their identity. In contrast, verifying the identity of the user by his associated trustees may significantly increase security and robustness of the identity verification since the trustees may be intimately acquainted with the user and may hold privately known information which may be shared strictly between themselves and the user. The trustees may therefore reliably, accurately and decisively determine and verify whether the user is indeed who he claims to be and detect potential impersonators.

In addition, applying the liveness verification algorithm(s) may further ensure that the users are genuine live people in order to prevent malicious impersonation of the users during the video conference sessions by potential impersonators, whether human, artificial, a previous recording of the user and/or synthetically fabricated (deep fake).

Also requesting the user to conduct gestures and/or pronounce syllables, words and/or sentences during the video conference session to further increase reliability of the liveness verification of the users since accurately, reliably and/or convincingly imitating such gestures and/or pronunciation may be significantly difficult.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process of recovering an online service account of a user based on verification of the user's identity by one or more trustees during a video conference session, according to some embodiments of the present invention.

An exemplary process 100 may be executed by an account recovery system to verify an identity of one or more users unable to access their accounts in an online service due to inability to provide at least some of their access credentials before initiating account recovery for the users.

Verification of the identity of the user may be based on identity verification by one or more trustees associated with the user which are acquainted with the user in the real world, for example, a family member, a work colleague, an instructor, a teacher and/or the like. Each trustee selected for verifying the user's identity may be first authenticated himself to ensure that the trustee is indeed the person claimed to be.

One or more of the trustees may verify the identity of the user during video conference session(s) established between the user, the respective trustee and a bot agent configured and operated to control the video conference session and guide the trustee during the verification process. The trustee(s) may verify the user based on visual appearance as well as based on real-world information provided by the user.

In case the trustee(s) positively verify the identity of the user, a recovery process may be initiated to provide the user access to his account.

Figure 2A:
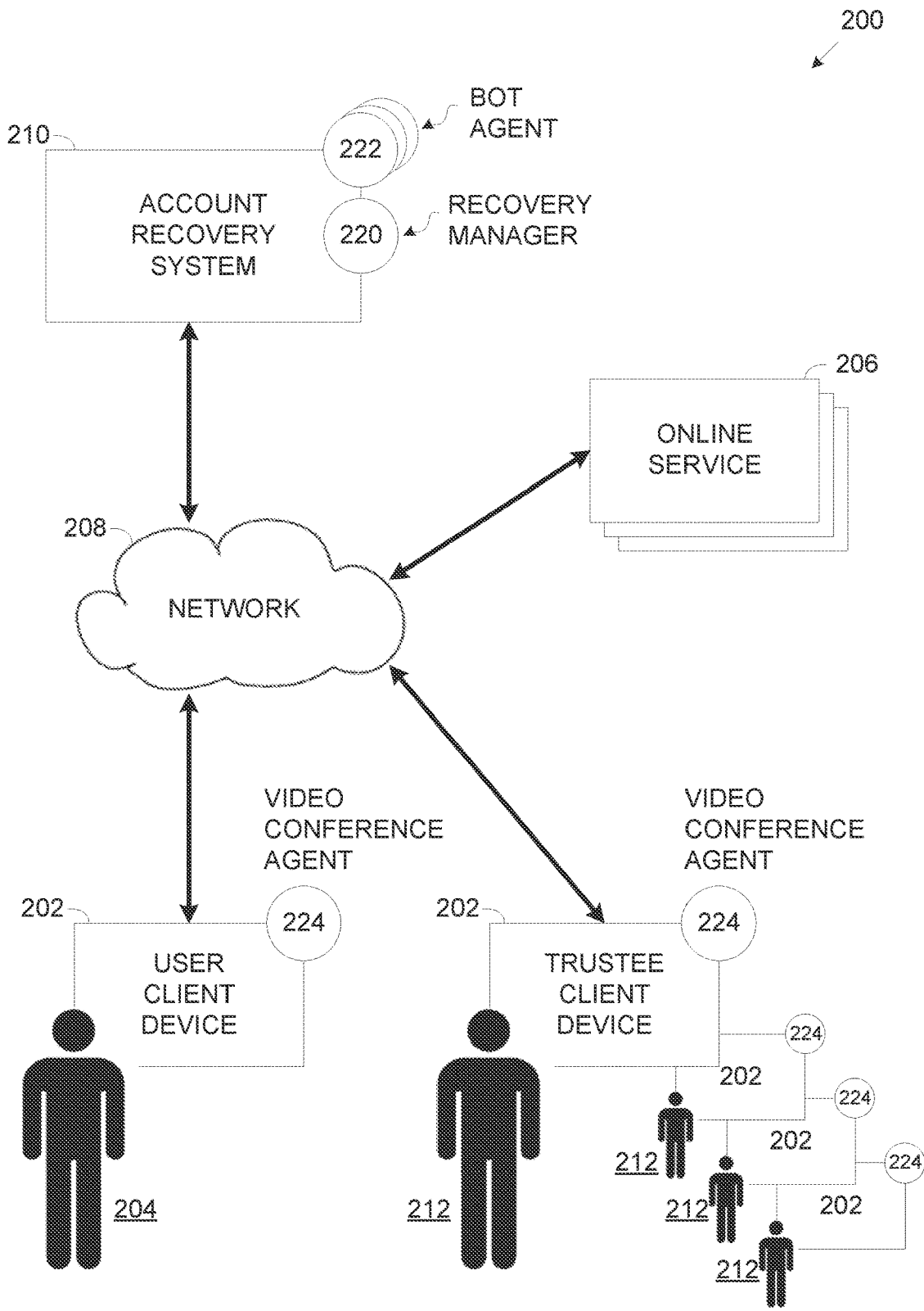
FIG. 2A and FIG. 2B are schematic illustrations of an exemplary system for recovering an online service account of a user based on verification of the user's identity by one or more trustees during a video conference session, according to some embodiments of the present invention.
Figure 2B:
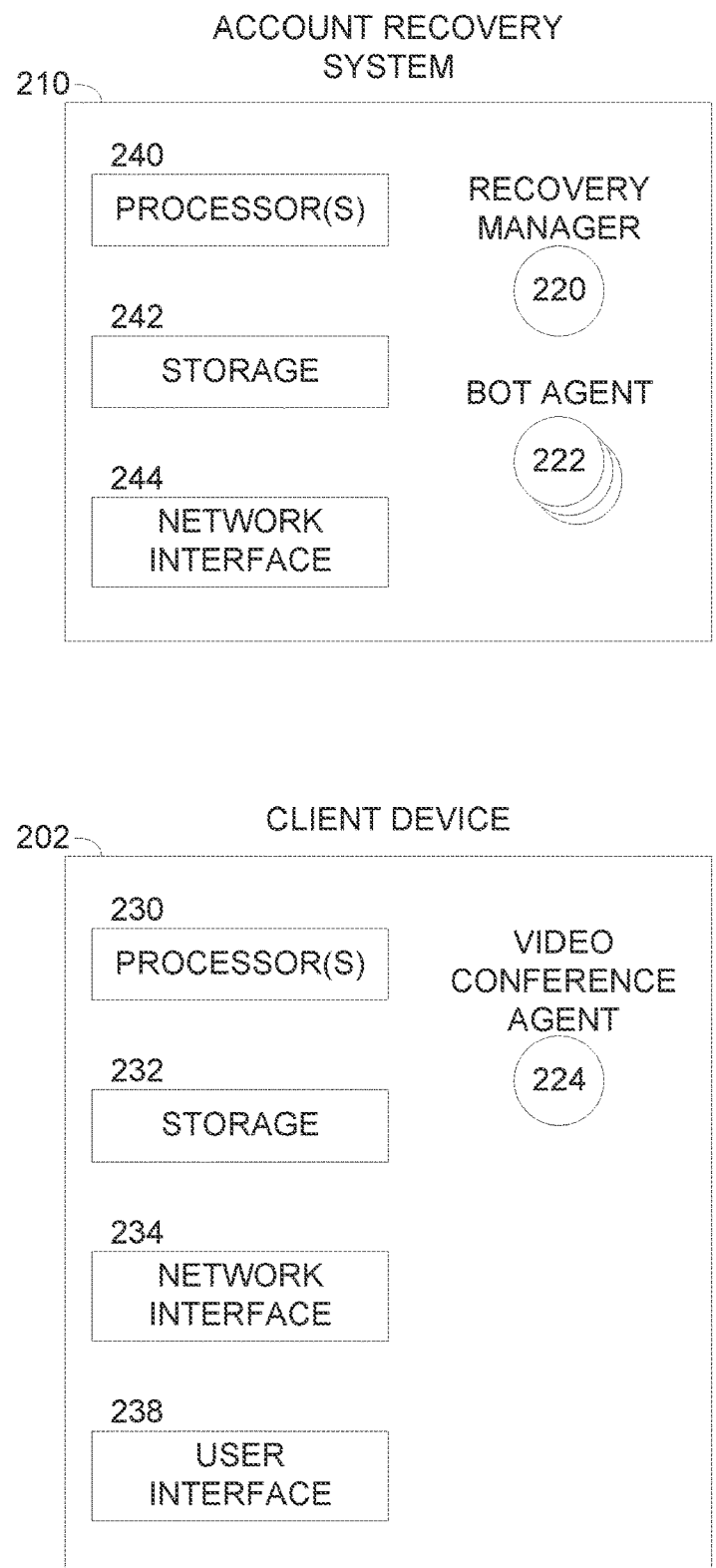

Reference is also made to FIG. 2A and FIG. 2B, which are schematic illustrations of an exemplary system for recovering an online service account of a user based on verification of the user's identity by one or more trustees during a video conference session, according to some embodiments of the present invention.

As seen in FIG. 2A, in an exemplary environment 200, a user 204 may use a client device 202, for example, a server, a desktop computer, a laptop computer, a Smartphone, a tablet, a proprietary client device and/or the like to access one or more online services 206, for example, a financial service, a social network service, an entertainment content streaming service, a gaming service, a secure system and/or the like.

The online services 206 utilized by, for example, a server, a computing node, a cluster of computing nodes, a cloud service, a cloud platform, a cloud application and/or the like may be accessible to the client device 202 used by the user 204 via a network 208 comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

In order to ensure its security, safety and/or privacy, access to the online service 206 may be restricted to users 204 having an account in the online service 206 such that an identity of each user 204 may be first verified (authenticated) before the user 204 is granted access to the online service 206. In particular, the identity of the users 204 may be verified based on access information (credentials) established for the user 204 when the account is setup, for example, a password, a code, a secret data item, a biometric signature (e.g. face pattern, iris pattern, fingerprint, etc.) and/or the like.

However, under some circumstances one or more users 204 may be unable to access their online service account due to inability to provide at least some of their access credentials and thus unable to authenticate themselves to the online service 206. In such case, the user(s) 240 may be locked out of their accounts in the online service 206 and may be unable to access and control their accounts. For example, a certain user 204 may lose or fail to remember his password, access code, and/or the like. In another example, a certain user 204 may fail to provide his biometric signature, for example, a face pattern due to failure or unavailability of sensor configured to capture the biometric signature.

An account recovery system 210 may be therefore deployed in order to enable one or more locked out users 204 to regain access to their accounts after successfully authenticated. The account recovery system 210, for example, a server, a computing node, a cluster of computing nodes and/or the like may execute a recovery manager 220 to execute the process 100 for verifying the identity of one or more user 204 who are unable to authenticate themselves and in case of successful verification initiate an account recovery process to enable the user 204 to regain access to their accounts.

According to some embodiments, the account recovery system 210 may be implemented by an Identity Provider (IDP) system and/or service serving one or more of the online services 206 for authenticating and proving users' identity and authorizing the authenticated users access to the online service(s) 206. However, according to some embodiments, the account recovery system 210 may be integrated in one or more of the online service 206 which may execute the recovery manager 220 themselves.

The recovery manager 220 receiving an account recovery request from the user 204 may verify the identity of the user 204, i.e., determine whether the user 204 is genuinely the person he claims to be, based on verification of the identity of the user 204 by one or more trustees 212 associated with the user 204.

Specifically, each trustee 212 associated with the user 204 may be acquainted with the user 204 in the real world and may be therefore able to attest and confirm the identity claimed by the user 204. The trustees 212 may therefore include people which are in some sort of relation with the user, for example, a social relation, a work relation, a collegial relation, an educational relation and/or the like. The trustees 212 may therefore include, for example, one or more family members, one or more work colleagues, one or more instructors, one or more teachers and/or the like.

Optionally, the user 204 and his associated trustee(s) 212 are members of a common organization, for example, a company, an office, an agency, an institution, and/or the like such that the user 204 and his associated trustee(s) 212 are members of a restricted and limited size community and are thus acquainted with each other and may be able to attest to the identity of each other.

Each trustee 212 associated with the user 204 may be associated accordingly in the account of the user 204. The association may be done, for example, during the account setup. However, associating one or more of the trustees 212 with user 204 may be done by the user at any later time after successfully authenticating himself to the online service 212 and logging into his account.

In particular, each trustee 212 is also capable of being authenticated by the recovery manager 220. For example, each trustee 212 may be registered to the IDP serving the online service 206 and may be therefore authenticated based on his registration data, for example, credentials at the IDP. In another example, each trustee 212 may be a user of the online service 206 and may be therefore authenticated accordingly by logging into his account in the online service 206.

In order to verify the identity of a user 204 requesting account recovery, the recovery manager 220 may initiate one or more video conference sessions each between the user 204 and a respective one of one or more of the trustees 212 associated with the user 204. For each video conference session with each trustee 212, the recovery manager 220 may initiate (launch, execute, operate, etc.) a bot agent 222 (also known as chatbot) which is a software application, process, agent and/or the like configured to participate in the respective video conference session to guide the respective trustee 212 through the verification process for verifying the identity of the user 204.

The video conference session established between the bot agent 222, the user 204 and the trustee 212 may be established between the bot agent 222 and video session agents 224 executed by the client device 202 used by the user 204 and by a client device such as the client device 202 used by the trustee 212.

As seen in FIG. 2B, the client device 202 may comprise a processor(s) 230, a storage 232 for storing data and/or code (program store), a network interface 234, and a user interface 236 for interacting with the user 204.

The processor(s) 230, homogenous or heterogeneous, may include one or more processing nodes and/or cores arranged for parallel processing, as clusters and/or as one or more multi core processor(s). The storage 232 may include one or more non-transitory persistent storage devices, for example, a Read Only Memory (ROM), a Flash array, a Solid State Drive (SSD), a hard drive (HDD) and/or the like. The storage 242 may also include one or more volatile devices, for example, a Random Access Memory (RAM) component, a cache and/or the like.

The network interface 234 may include one or more wired and/or wireless network interfaces for connecting to the network 208, for example, a LAN interface, a WLAN interface, a WAN interface, a MAN interface, a cellular interface and/or the like. Via the network interface 244, the client device 202 may access the online services 206, communicate with the account recovery system 210 and/or communicate with one or more of the trustees 212 using respective client devices 202.

The user interface 236 may include one or more Human-Machine Interfaces (HMI) for interacting with the user 204 and/or the trustee 212, for example, a keyboard, a touchpad, a pointing device, a touchscreen, a screen, a digital pen, a speaker, an earphone, a microphone and/or the like.

The client device 202 may optionally include an Input/Output (I/O) interface comprising, for example, one or more imaging sensors, for example, a camera, a video camera, a web camera and/or the like for capturing one or more images of its user, for example, a face image, an eye image and/or the like which may be used for biometric authentication. In another example, the I/O interface may include one or more tactile sensors, for example, a fingerprint reader configured to capture a fingerprint for biometric authentication, for connecting to one or more external and/or attachable devices. The I/O interface may further include one or more wired and/or wireless I/O interfaces, for example, a Universal Serial Bus (USB) port, a serial port, a Bluetooth (BT) interface, a Radio Frequency (RF) interface, an infrared (IR) interface, a Near Field (NF) interface and/or the like for communicating and/or attaching to one or more external devices and/or attachable devices, for example, a USB key dongle, a USB mass storage device, a wireless (e.g., RF, IR, NF, etc.) key and/or the like.

The processor(s) 230 may execute one or more software modules such as, for example, a process, a script, an application, an agent, a utility, a tool and/or the like each comprising a plurality of program instructions stored in a non-transitory medium (program store) such as the storage 232 and executed by one or more processors such as the processor(s) 230. Optionally, the processor(s) 230 may include one or more hardware elements integrated in the client device 202 to support one or more of the software modules executed by the client device 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

For example, the processor(s) 240 may execute one or more software modules, for example, a web browser, a local agent, an access utility and/or the like for accessing one or more of the remote secure online resources 206 and/or the IDP executing the recovery manager 220.

The processor(s) 240 may further execute the video conference agent 224 which may be utilized, for example, by one or more locally executed applications. In another example, the video conference agent 224 may be utilized by one or more web applications and/or services provided by one or more video conference services accessible and executable by a web browser executed by the client device 202.

The account recovery system 210 may comprise a network a processor(s) 240 such as the processor(s) 230 for executing the process 100, a storage 242 for storing data and/or code (program store) and a network interface 244 such as the network interface 234 for connecting to the network 208.

The processor(s) 240, homogenous or heterogeneous, may include one or more processing nodes arranged for parallel processing, as clusters and/or as one or more multi core processor(s). The storage 242 may include one or more non-transitory persistent storage devices, for example, a ROM, a Flash array, an SSD, an HDD and/or the like, as well as one or more volatile devices, for example, a RAM component, a cache and/or the like. The storage 242 may further comprise one or more network storage devices, for example, a storage server, a Network Accessible Storage (NAS), a network drive, a database server and/or the like accessible through the network interface 244.

The processor(s) 240 may execute one or more software modules each comprising a plurality of program instructions stored in a non-transitory medium (program store) such as the storage 242 and executed by one or more processors such as the processor(s) 240. The processor(s) 240 may further utilize one or more hardware elements integrated in the account recovery system 210, for example, a circuit, a component, an IC, an ASIC, an FPGA, a DSP, a GPU, a network processor and/or the like.

The processor(s) 240 may therefore execute one or more functional modules implemented using one or more software modules, one or more of the hardware modules and/or combination thereof. For example, the processor(s) 240 may execute the recovery manager 220 for executing the process 100 to verify the identity of the user 100 and further initiate an account recovery process in case of successfully identity verification.

The processor(s) 240 may further execute one or more bot agents such as the bot agent 222 for controlling one or more video conference session between the user 204 and his associated trustee(s) 212, in particular for guiding one or more of the trustees 212 through the verification process of the identity of the user(s) 204.

Optionally, the account recovery system 210, specifically the recovery manager 220 and the bot agent(s) 222 may be implemented as one or more cloud computing services, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

The process 100 and the environment 200 are described herein after for a single user 204 requesting account recovery and authenticated by one or more trustees 212 before its account in a single online service 206 may be recovered to enable the user 204 to regain access to his account. This, however, should not be construed as limiting since, as may be apparent to a person skilled in the art, the process 100 and the environment 200 may be easily expanded and scaled for a plurality of users such as the user 204 requesting to recover their accounts in a plurality of services such as the online service 206. The process 100 may be initiated for each of the plurality users 204 to first authenticate the respective user 204 based on the verdict of one or more trustees 212 associated with the respective user 204 and following the authentication process, initiate account recovery for each user 204 whose identity is successfully verified.

As shown at 102, the process 100 starts with the recovery manager 220 receiving an account recovery request from a user 240 who is unable to access to his account in a service 206 and is practically locked out of the online service 206.

The user 204 may be unable to access his account due to his inability to provide at least some of the account access information, i.e., his access credentials and thus unable to authenticate himself to the online service 206 which may therefore deny the user 204 access to his account. For example, the user 204 may lose or fail to remember his account password, access code, and/or the like. In another example, the user 204 may have lost his mobile device (e.g. Smartphone) registered in his account to which he should receive an access code, for example, a One Time Password (OTP) for accessing his account. In another example, assuming the user 204 needs to authenticate himself to the online service 206 by his biometric signature, for example, a face pattern, a fingerprint and/or the like. Further assuming the mobile device 202 used by the user 204 to access the online service 206 lacks one or more of the sensors required to capture his biometric pattern (e.g. imaging sensor, tactile sensor, etc.) or have one or more of these sensors failed or malfunctioning. In such case, the user 204 may be unable to provide his biometric signature to access his account.

As shown at 104, the recovery manager 220 may optionally assign a unique secret, for example, a password, a code, a private key, a shared secret and/or the like specifically for the current specific identity verification process 100 comprising an account recovery session subject to successful verification of the identity of the user 204 (authentication). This means that a respective unique secret may be assigned for each identity verification process 100 and hence for each account recovery session.

The recovery manager 220 may further transmit the unique secret to the user 204 for later use during the account recovery process. The recovery manager 220 may communicate with the user 204 via the client device 202 used by the user 204 which may execute one or more applications through which the user 204 may interact with the recovery manager 220, for example, a web browser, a local agent (application) and/or the like.

As shown at 106, the recovery manager 220 may select a trustee 212 from one or more trustees 212 associated with the user 204. The trustees 212 associated with the user 204 may be acquainted with the user 204 in the real world and may therefore attest and confirm the identity claimed by the user 204.

Each trustee 212 associated with the user 204 may be in some sort of relation with the user, for example, a social relation, a work relation, a collegial relation, an educational relation and/or the like. The trustee 212 may therefore be, for example, a family member, a work colleague, an instructor, a teacher and/or the like.

Each trustee 212 associated with the user 204 may be associated accordingly in the account of the user 204 such that the recovery manager 220 may identify the trustee(s) 212. The trustee(s) 212 may be defined in the account of the user 204, for example, during the account setup and/or at a later time after the user 204 successfully authenticates himself to the online service 212 and logs into his account.

However, each of the trustee(s) 212 associated with the user 204 must be a registered user at the IDP and/or have an active account in the online service 206 such that the trustee 212 may be authenticated accordingly before allowed to participate in the verification process for verifying the identity of the user 204.

Optionally, the trustee 212 is selected and/or indicated by the user 204. The recovery manager 220 may therefore communicate with the user 204 via the client device 202 to request the user 204 to indicate the selected trustee 212.

As shown at 108, the recovery manager 220 may invite the selected trustee 212 to join the verification process for verifying the identity of the user 204 and may further authenticate the trustee 212 to verify his identity and ensure the trustee 212 is genuine and indeed the person claimed to be.

The recovery manager 220 may invite the selected trustee 212 via one or more contact channels predefined for the trustee 212 in the account of the user 204 and/or in the account of the trustee 212 in the online service 212 and/or in the IDP. The contact channels for informing and inviting the trustee 212 may include, for example, an email message to an email address of the trustee 212, a text message to the mobile device 202 used by the trustee 212 such as, for example, a Short Message Service (SMS) message, a WhatsApp message, and/or the like.

The recovery manager 220 may authenticate the selected trustee 212 according to his account in the online service 206 and/or registration at the IDP. For example, the trustee 212 may be authenticated by logging into his account in the online service 206. Since access to the online service 206 is subject to successful authentication, logging into his account may serve as proof of the identity of the trustee 212. In another example, the trustee 212 may be authenticated and verified according to his registration information and/or credentials recorded at the IDP.

As shown at 110, the recovery manager 220 may establish a video conference session during which the trustee 212 may verify the identity of the use 204, specifically, the trustee 212 may confirm or disprove the identity claimed by the user 204.

The recovery manager 220 may establish the video conference session between the user 204 and the trustee 212 using their respective client devices 202 executing the video conference agent 224 to participate in the video conference session. The video conference agent 224 may be utilized, for example, by one or more applications locally executed by the client devices 202 and configured to communicate with other. In another example, the video conference may be provided by one or more online video conference services which may be accessed and/or executed by one or more applications executed by the client devices 202, for example, a web browser, a locally executed agent (application) and/or the like.

The recovery manager 220 may further initiate a bot agent 222 to participate and control the video conference session. In particular, the recovery manager 220 may initiate the bot agent 222 to guide the trustee 212 in verifying the identity of the user 204. The bot agent 222 may be instantiated and executed as known in the art and its operation is beyond the scope of the current disclosure.

As shown at 112, the recovery manager 220 may operate and/or instruct the bot agent 222 to guide the trustee 212 during video conference session for verifying the identity of the user 204, specifically, the trustee 212 may confirm or disprove the identity claimed by the user 204.

For example, the recovery manager 220 may operate the bot agent 222 to present the identity claimed identity by the user 204 to the trustee 212. In response, the bot agent 222 may present, via the client device 202 of the trustee 212, one or more messages comprising the claimed identity, for example, a visual message, an audible message, a text message and/or the like.

The recovery manager 220 may then operate the bot agent 222 to instruct the trustee 212 to visually inspect the user 204 as seen in the video conference session to determine whether the user 204 is indeed who he claims to be based on his visually appearance and verify or disapprove the user 204 accordingly.

Optionally, the recovery manager 220 may apply one or more liveness verification algorithms as known in the art configured to verify liveness of the user 204 participating in the video conference session. As such, the liveness verification algorithm(s) may be applied to estimate and determine accordingly whether the user 204 is a real live person. The liveness verification algorithm(s) are not applied to identify a specific person such as the user 204 but rather estimate and determine accordingly whether the person seen in the video conference session is a real in order to prevent imitation and/or simulation of the user 204 in attempt to impersonate as the user 204 and mislead the trustee 212.

The liveness verification algorithm(s) may be applied to detect potential impersonation of the user 204 which may be done using one or more techniques and/or technologies. For example, the liveness verification algorithm(s) may be applied to detect whether the image of the user 204 seen in the video conference session is constructed by synthetic media simulating the face of the user 204 ("deep fake"). In another example, the liveness verification algorithm(s) may be applied to detect whether the user 204 seen in the video conference session is actually another person wearing a mask in attempt to imitate and/or mimic the genuine user 204. In another example, the liveness verification algorithm(s) may be applied to detect whether the image of the user 204 seen in the video conference session is a picture of the user 204, a video of the user 204 and/or the like presented in attempt to impersonate the user 204.

Moreover, the recovery manager 220 may operate the bot agent 222 to instruct the user 204 to perform one or more gestures which may be visually analyzed to estimate, determine and/or verify liveness of the user 204. The gestures the user 204 may be instructed to conduct may include, for example, node his head, close an eye, open his mouth, smile, touch his ear, lift his hand, point a finger and/or the like. The gestures which may be visually analyzed, for example, by the recovery manager 220, by the liveness verification algorithm(s) and/or by another application(s) may significantly increase the ability, accuracy and/or certainty of determining whether the user 204 is a real person or a potential impersonator since such gestures may be significantly difficult to reliably and/or convincingly imitate.

The recovery manager 220 may further operate the bot agent 222 to instruct the user 204 to pronounce one or more syllables which may be analyzed to verify liveness of the user 204. The bot agent 222 may be operated the users 204 to pronounce, i.e., say or speak one or more syllables, words and/or sentences which may be analyzed, for example, by the recovery manager 220, by the liveness verification algorithm(s) and/or by another application(s) to estimate and determine accordingly whether the user 204 participating in the video conference session is a real person. Analyzing the audible pronunciation may further increase the ability, accuracy and/or certainty of determining whether the user 204 is a real person or a potential impersonator since it may be highly difficult to reliably and/or convincingly generate such pronunciation.

Optionally, the recovery manager 220 may further operate the bot agent 222 to instruct the trustee 212 to request the user 204 to provide one or more real-world information items relating to the user 204. In particular, the bot agent 222 may be operated to instruct the trustee 212 to request the user 204 for information (items) that is known to the trustee 212 that is acquainted with the user 204 in the real-world. Moreover, the information that the trustee 212 requests from the user 204 may be such information that is not known or not easily known to people other than the user 204 or his close social circle and preferably known only to the user 204 and to the trustee 212.

The bot agent 222 may be therefore operated to instruct the trustee 212 to ask the user 204 to answer one or more questions whose answers are known to the trustee 212. For example, the trustee 212 may be instructed to ask the user 204 of the location where their most recent meeting took place. In another example, the trustee 212 may be instructed to ask the user 204 of a certain work related topic or issue that they recently discussed. In another example, the trustee 212 may be instructed to ask the user 204 of a certain detail of an event they both participated in, for example, a joint vacation, a joint business trip, a party and/or the like.

The trustee 212 may evaluate the information item(s) provided by the user 204 in response to his interrogation questions and may determine accordingly whether the user 204 is indeed the person he claims to be or not, i.e., verify the identity of the user 204.

As shown at 114, which is a conditional step based on the verification verdict of the trustee 112, in case the trustee 212 successfully verifies the identity of the user 204 during the video conference session, the process may branch to 118. However, in case the trustee 212 determines that the user 204 is not who he claims to be, the trustee 112 may disapprove the identity of the user 204. In such case the process 100 may branch to 116.

Optionally, in case the trustee 212 is uncertain of whether the user 204 is who he claims to be, the trustee 212 may indicate the recovery manager 220 accordingly that he is unable to decisively verify or disapprove the identity of the user 204.

As shown at 116, the recovery manager 220 may deny the request of the user 204 to initiate the account recovery process for his account since the identity of the user could not be verified by the trustee(s) 112.

As shown at 118, which is another decision step, the recovery manager 220 may repeat the process 100 with one or more other trustees 212 associated with the user 204. In case another trustee 212 needs to be engaged in order to verify the identity of the use 204, the process may branch to 106. However, in case no additional trustee(s) 212 need to be engaged to verify the identity of the user 204, the process may branch to 120.

In case one or more trustee(s) need to engaged to verify the identity of the user 204, the recovery manager 220 may repeat the process 100, specifically, steps 106-114 to interact with another trustee 212 to verify (or disapprove) the identity of the user 204 during another video conference session established between the user 204, the another trustee 212 and a bot agent 222 initiated for the another video conference session.

The recovery manager 220 may engage with one or more additional trustees 212 under one or more scenarios and/or according to one or more predefined rules. For example, a certain rule applicable for the online service 206 may require at least two different trustees 212 to positively verify the identity of the user 204. In such case, the recovery manager 220 may repeat the process 100 with at least one another trustee 212. In another example, assuming the trustee 212 was unable to decisively verify or disapprove the identity of the user 204, the recovery manager 220 may repeat the process 100 with one or more other trustees 212.

Moreover, one or more of the rules defined to indicate the number of trustees 212 required to verify the identity of the user 204 may be based on weights which may be optionally assigned to one or more of the trustees 212 associated with the user 204. The weights may be indicative of importance, significance, relevance and/or rank of the respective trustee 212, in particular with respect to the user 204. For example, a first trustee 212, for example, a close relative of the user 204, for example, a father may be assigned a high weight since he may be significantly more familiar and acquainted with the user 204 compared to a second trustee 112, for example, a teacher of the user 204 who may be therefore assigned a low weight. In another example, a first trustee 212, for example, a high-ranking senior manager of the user 204 may be assigned a high weight since his responsibility in general and for the organization in particular may be significantly high compared to a second trustee 112, for example, a low level colleague of the user 204 who may be therefore assigned a low weight.

The recovery manager 220 may therefore engage with one or more additional trustees 212 according to one or more of the weight based predefined rules. For example, a certain rule may define that one high weight trustee 212 may be sufficient to verify the identity of the user 204. However, the certain rule may further define that in case there is no available trustee 212 having a weight exceeding a certain threshold, two lower weight trustees 212 should be engaged to verify the identity of the user 204.

Optionally, a plurality of trustees 212 may participate in a single video conference session to verify the identity of the user 204. In such case, the recovery manager 220 may select multiple trustees 212 and invite them to a video conference session which may be conducted as described herein before. At step 114, the recovery manager 220 may aggregate the verification verdicts received from the plurality of trustees 212 who participated in the video conference session.

Optionally, in addition to the verification verdict of the trustee(s) 212, the recovery manager 220 may further verify the identity of the user 204 based on one or more biometric signatures of the user 204. The recovery manager 220 may apply one or more biometric verification tools, algorithms and/or methods as known in the art to verify one or more biometric patterns of the user 204 captured during the video conference session compared to respective biometric signature recorded in the account of the user 204. Such biometric patterns and respective signatures may include, for example, a face pattern, an iris pattern, a voice pattern a fingerprint pattern and/or the like.

Moreover, in addition to authentication of the trustee 212 according to his account and/or registration information, the recovery manager 220 may also further verify the identity of the trustee 212 based on one or more of the biometric signatures of the trustee 212.

As shown at 120, since the identity of the user 204 is successfully verified and the user 204 is authenticated, the recovery manager 220 may initiate an account recovery session to enable the user 204 to regain access to his account in the online service 206.

The recovery manager 220 may apply one or more methods, techniques and/or implementations for initiating the account recovery process. For example, the recovery manager 220 may transmit a one-time link to the client device 202 used by the user 204. The one-time link which may be time limited and expire after a predefined time period, for example, one minute, five minutes, half an hour and/or the like may point to a recovery site typically associated with the online service 206 in which the user 204 may follow a sequence as known in the art to regain access to his account. In another example, the recovery manager 220 may transmit a time limited OTP to the client device 202 of the user 204 which may be used by the user 204 to access his account and update his access credentials for future log-in sessions at the online service 206.

Optionally, during the account recovery process, for example, when accessing the recovery site or when inserting the OTP, the user 204 may be asked to provide the unique secret optionally assigned to the verification process as described in step 104 of the process 100. Optionally, the unique secret stored in the client device 202 may be automatically provided by the client device 202 during the recovery process. The unique secret may be used to uniquely correlate the specific account recovery process conducted for the user 204 with the specific identity verification process 100 conducted for the user 204. This correlation may prevent potential malicious attempts to conduct another or an alternative verification process to initiate an account recovery process in attempt to falsely gain access to the account of the user 204.

Optionally, the account recovery session, in particular, one or more of the video conference sessions held between the user 204 and one or more of the trustees 212 may be recorded and stored, for example, in the storage 242, in a cloud storage resource and/or the like. Moreover, a notification of the account recovery session and pointer to the stored video conference session(s) may be transmitted to one or more authorized personnel (e.g. IT person, etc.) and/or one or more automated systems, for example, an access logging system. The stored video conference session(s) may be analyzed, either in real-time and/or later, specifically in case of suspected fraudulent access or attempted access to further investigate whether the accessing user(s) is genuine as well as explore potential deficiencies in the conduct of the trustees and/or in the operation of the bot agent.

Figure 3:
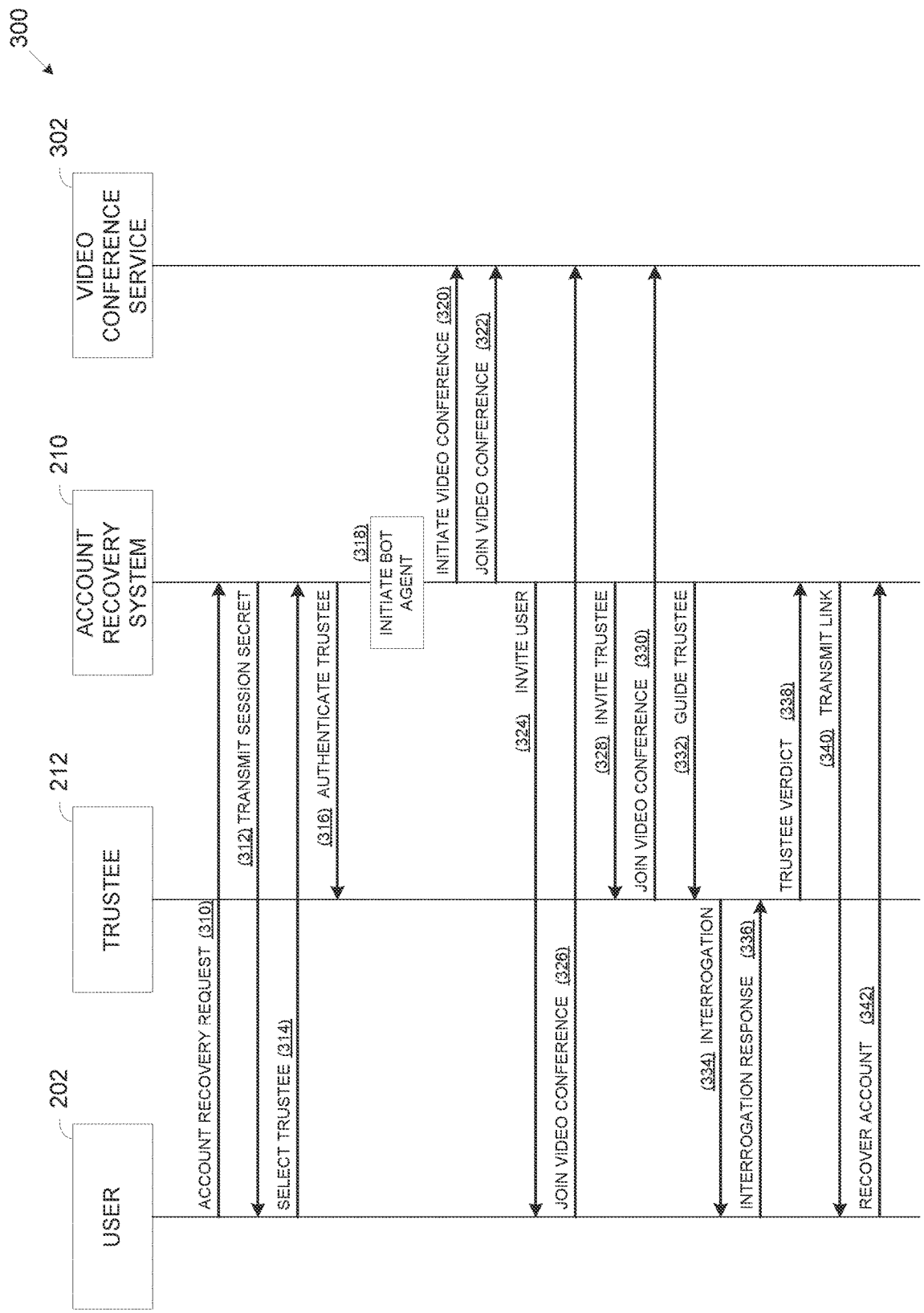
FIG. 3 is a schematic illustration of an exemplary flow of recovering an online service account of a user based on verification of the user's identity by one or more trustees during a video conference session, according to some embodiments of the present invention.

Reference is now made to FIG. 3, which is a schematic illustration of an exemplary flow of recovering an online service account of a user based on verification of the user's identity by one or more trustees during a video conference session, according to some embodiments of the present invention.

An exemplary flow 300 implementing the process 100 may be conducted by an account recovery system such as the account recovery system 210 to verify an identify of a user such as the user 204 after verifying the identity of the user 204 by one or more trustees such as the trustee 212 associated with the user 204 and having real-world acquaintance with the user 204.

For brevity, the interaction in the flow 300 is described between the user 204 and the account recovery system 210 as well as between the trustee 212 and the account recovery system 210. It should be clear however, that in reality communication between these entities is done between a recovery manager such as the recovery manager 220 and client devices such as the client device 202 used by the use 204 and the trustee 212.

As seen in the flow 300, the user 204 unable to access his account in an online service such as the online service 206 may transmit an account recovery request to the account recovery system 210 (310) in order to regain access to his account. In response, the account recovery system 210 may initiate a verification process to verify the identity of the user 204 before initiating the account recovery process.

The account recovery system 210 may further assign a unique secret to the verification process and may transmit the unique secret to the user 204 (312).

In response to a request prompt by the account recovery system 210, the user 204 may select a trustee 212 (314) that may be invited to attest the identity of the user 204. The account recovery system 210 may then invite the selected trustee 212 to verify the identity of the user 204 and may further authenticate the trustee 212 (316) to ensure that the trustee 212 is genuinely the person claimed to be.

The account recovery system 210 may initiate a bot agent such as the bot agent 222 (318) to participate and control a video conference session in which the trustee 212 may verify the identity of the user 204. The account recovery system 210 may communicate with a video conference service 302 to establish the video conference session (320) between the user 204, the trustee 212 and the bot agent 222. The account recovery system 210 may then operate the bot agent 222 to join the video conference session (322).

The account recovery system 210 may invite the user 204 (324) and the trustee 212 (328) to join the video conference session and in response the user 204 may join the video conference session (326) and also the trustee 212 may join the video conference session (330).

The account recovery system 210 may then operate the bot agent 222 to guide the trustee 212 in the verification process (322), in particular to instruct the trustee 212 to interrogate the user 204 to provide real-world information typically known only to the user 204 and the trustee 212. The trustee 212 may interrogate the user 240 accordingly (334) and the user 204 may provide one or more information items in response (336).

Based on the interrogation and further based on visual appearance of the user 204, the trustee 212 may provide his verification verdict (338) to the account recovery system 210 which in case of successful verification of the user 204 may transmit a recover link to the user 204 (340). The user 204 may use the recovery link, optionally with the unique secret initially assigned to the verification process, to recover his account (342) in the online service 206.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms client device, BOT agent, and video conference agent are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of recovering an account of a user based on verification of the user in a video conference, comprising:
   receiving a request for recovering an account of a user of an online service;
   establishing at least one video conference session between a client device used by the user, another client device used by at least one trustee associated with the user and a bot agent initiated for the at least one video conference session;
   operating the bot agent during the at least one video conference session to guide the at least one trustee to verify an identity of the user;
   operating the bot agent during the at least one video conference session to instruct at least one of the user and the at least one trustee, wherein instructing the user comprises instructing the user to perform at least one gesture and/or to pronounce at least one syllable, and wherein instructing the at least one trustee comprises instructing the at least one trustee to request the user to provide at least one real-world information item relating to the user; and
   initiating an account recovery process for the account of the user in response to receiving a positive verification verdict from the at least one trustee.

2. The computer implemented method of claim 1, further comprising verifying the identity of the user by a plurality of trustees associated with the user by:
   establishing at least one another video conference session between the client device used by the user, another client device used by at least one another trustee associated with the user and another bot agent,
   operating the another bot agent during the at least one another video conference session to guide the at least one another trustee to verify the identity of the user, and
   initiating the account recovery process in response to receiving a positive verification verdict from the at least one trustee and from the at least one another trustee.

3. The computer implemented method of claim 1, wherein the at least one trustee associated with the user is acquainted with the user.

4. The computer implemented method of claim 1, wherein the user and his associated at least one trustee are members of a common organization.

5. The computer implemented method of claim 1, wherein the at least one trustee is invited to the at least one video conference session by transmitting at least one message to the at least one trustee via at least one contact channel predefined for the at least one trustee.

6. The computer implemented method of claim 1, wherein the at least one trustee is admitted into the at least one video conference session after successfully authenticated.

7. The computer implemented method of claim 1, wherein the guidance provided by the bot agent comprises presenting the claimed identity of the user to the at least one trustee.

8. The computer implemented method of claim 1, wherein the guidance provided by the bot agent comprises instructing the at least one trustee to verify the identity of the user based on visual appearance of the user.

9. The computer implemented method of claim 8, further comprising applying at least one liveness verification algorithm configured to determine the user is genuine.

10. The computer implemented method of claim 9, further comprising operating the bot agent to instruct the user to perform said at least one gesture, said at least one gesture is visually analyzed to verify liveness of the user.

11. The computer implemented method of claim 9, further comprising operating the bot agent to instruct the user to pronounce the at least one syllable, said at least one syllable is analyzed to verify liveness of the user.

12. The computer implemented method of claim 1, wherein the guidance provided by the bot agent further comprising instructing the at least one trustee to request the user to provide the at least one real-world information item relating to the user that is used by the at least one trustee to verify the identity of the user.

13. The computer implemented method of claim 1, further comprising further verifying the identity of the user, in addition to the verification verdict of the at least one trustee, based on at least one biometric pattern of the user captured during the at least one video conference session compared to a respective biometric signature recorded in the account of the user, the at least one biometric pattern is a member of a group consisting of: a face pattern, an iris pattern, a voice pattern and a fingerprint pattern.

14. The computer implemented method of claim 1, wherein the account recovery process is initiated by transmitting to the client device used by the user a one-time use link to a recovery site.

15. The computer implemented method of claim 14, further comprising transmitting a unique secret assigned to the account recovery process to the client device used by the user, the unique secret is provided via the client device when accessing the recovery site.

16. A system for recovering an account of a user based on verification of the user in a video conference, comprising:
   at least one processor configured to execute a code, the code comprising:
      code instructions to receive a request for recovering an account of a user of an online service;
      code instructions to establish at least one video conference session between a client device used by the user, another client device used by at least one trustee associated with the user and a bot agent initiated for the at least one video conference session;
      code instructions to operate the bot agent during the at least one video conference session to guide the at least one trustee to verify an identity of the user;
      code instructions to operate the bot agent during the at least one video conference session to instruct at least one of the user and the at least one trustee, wherein instructing the user comprises instructing the user to perform at least one gesture and/or to pronounce at least one syllable, and wherein instructing the at least one trustee comprises instructing the at least one trustee to request the user to provide at least one real-world information item relating to the user; and
      code instructions to initiate an account recovery process for the account of the user in response to receiving a positive verification verdict from the at least one trustee.

17. A computer program product for recovering an account of a user based on verification of the user in a video conference, comprising a non-transitory medium storing thereon computer program instructions which, when executed by at least one hardware processor, cause the at least one hardware processor to:

receive a request for recovering an account of a user of an online service;

establish at least one video conference session between a client device used by the user, another client device used by at least one trustee associated with the user and a bot agent initiated for the at least one video conference session;

operate the bot agent during the at least one video conference session to guide the at least one trustee to verify an identity of the user;

operate the bot agent during the at least one video conference session to instruct at least one of the user and the at least one trustee, wherein instructing the user comprises instructing the user to perform at least one gesture and/or to pronounce at least one syllable, and wherein instructing the at least one trustee comprises instructing the at least one trustee to request the user to provide at least one real-world information item relating to the user; and initiate an account recovery process for the account of the user in response to receiving a positive verification verdict from the at least one trustee.

\* \* \* \* \*